United States Patent [19]

Heuseveldt et al.

[11] Patent Number: 5,496,880
[45] Date of Patent: Mar. 5, 1996

[54] POLYMER MIXTURES AND ARTICLES FORMED THEREFROM

[75] Inventors: Jan W. Heuseveldt; Johannes van Helmond, both of Bergen op Zoom; Hendrikus H. T. M. Ketels, Huybergen, all of Netherlands

[73] Assignee: General Electric Company, Pittsfield, Mass.

[21] Appl. No.: 239,627

[22] Filed: May 9, 1994

[30] Foreign Application Priority Data

May 10, 1993 [NL] Netherlands ............... 9300788

[51] Int. Cl.$^6$ ............... C08K 3/32; C08K 3/34; C08K 3/04; C08L 67/02
[52] U.S. Cl. ............ 524/417; 524/451; 524/605; 524/495
[58] Field of Search ............... 524/417, 451, 524/495, 496, 605

[56] References Cited

U.S. PATENT DOCUMENTS

| | | | |
|---|---|---|---|
| 3,953,539 | 4/1976 | Kawase et al. | 260/860 |
| 4,351,758 | 9/1982 | Lu et al. | 524/451 |
| 4,699,942 | 10/1987 | Weaver et al. | 524/451 |
| 5,114,998 | 5/1992 | Golder et al. | 524/451 |
| 5,252,653 | 10/1993 | van Helmond | 524/417 |
| 5,367,011 | 11/1994 | Walsh | 524/417 |

FOREIGN PATENT DOCUMENTS 1060401  2/1964  United Kingdom.

Primary Examiner—Peter A. Szekely

[57] ABSTRACT

The invention relates to polymer mixtures comprising a first polyalkylene phthalate, for example, polybutylene terephthalate, and a second polyalkylene phthalate and/or a thermoplastic elastomer and phosphorus compounds. It has been found that, with regard to the crystallisation behaviour, the addition of certain nucleating agents (namely talcum or carbon black) show a synergistic effect with certain phosporus compounds.

7 Claims, No Drawings

POLYMER MIXTURES AND ARTICLES FORMED THEREFROM

The invention relates to a polymer mixture comprising

A. a first polyalkylene phthalate which comprises more than 35 mol% of units derived from 1,4-butanediol and which comprises more than 35 mol% of units derived from terephthalic acid; and B. B1 a second polyalkylene phthalate which comprises less than 15 mol% of units derived from 1,4-butanediol; or B2 a thermoplastic elastomer selected from a polyether ester block copolymer, a polyester ester urethane and a polyether imide ester or a mixture thereof; or B3 a mixture of B1 and B2; and C. a certain type of transesterification inhibitor as indicated hereinafter, and D. a certain type of nucleating agent as indicated hereinafter.

The invention also relates to articles formed from a polymer mixture according to the invention.

The use of transesterification inhibitors in polymer mixtures is known per se. For example, U.S. Pat. No. 3,953,539 describes polymer mixtures which comprise a polyalkylene phthalate, an aromatic polycarbonate and a transesterification inhibitor. According to U.S. Pat. No. 3,953,539, for example, the salts of a large number of different metals with phosphorus acids may be used. As specific examples are mentioned salts of sodium, calcium, aluminium, potassium and magnesium.

GB 1,060,401 discloses a method of preparing stable compositions of block copolyesters or of polyester mixtures with at least two polyesters. Phosphorus compounds are added to the compositions so as to avoid or delay an ester interchange. A large number of phosphorus compounds are mentioned, among which inorganic phosphorus compounds, for example, diammonium hydrogen phosphate, ammonium dihydrogen phosphate, magnesium-hydrogen phosphate and manganese hydrogen phosphate. The hydrogen phosphates just mentioned have for their disadvantage that they negatively influence the mechanical properties, for example, the tensile strength and the impact strength. The thermal properties, for example, HDT (Heat Deflection Temperature) and vicat value, are negatively influenced.

Dutch non-prepublished Patent Application 9300194 discloses similar polymer mixtures with zinc or calcium hydrogen phosphate as transesterification inhibitors.

Nucleating agents are sometimes added to polyesters and polyester mixtures to influence the crystallisation behaviour.

The invention is based on the discovery that a synergistic effect with respect to the crystallisation behaviour occurs when the combination of certain transesterification inhibitors and certain nucleating agents is used.

The polymer mixture according to the invention comprises a transesterification inhabitor (C) selected from an inorganic pyrophosphate; an inorganic phosphate having at least two acid hydrogen atoms or an inorganic orthophosphate with crystal water or a mixture of one or more of these phosphates and a nucleating agent (D) selected from talcum, carbon black or a mixture thereof.

The polymer mixture according to the invention comprises at any rate one or more of the following constituents:

A. a first polyalkylene phthalate which comprises more than 35 mol% of units derived from 1,4-butanediol and which comprises more than 35 mol% of units derived from terephthalic acid; and B.1 a second polyalkylene phthalate which comprises less than 15 mol% of units derived from 1,4- butanediol; or B.2 a thermoplastic elastomer selected from a polyether ester block copolymer, a polyester ester urethane or a polyether imide ester or a mixture thereof, or B.3 a mixture of B1 and B2; and C. a transesterification inhibitor selected from an inorganic pyrophosphate; an inorganic phosphate having at least two acid hydrogen atoms or an inorganic orthophosphate with crystal water or a mixture of one or more of these phosphates; and D. a nucleating agent selected from talcum, carbon black or a mixture thereof.

In addition to the constituents mentioned hereinbefore, the polymer mixture may comprise any conventionally used additives. By way of example may be mentioned in particular polymeric additives to improve the impact strength, flame-retarding additives, reinforcing and non-reinforcing fillers, oxidation stabilisers, mould-release agents, processing additives, dyes and/or pigments. In addition, the polymer mixture may also comprise antimony oxide as an auxiliary agent, in particular when it comprises a flame-retarding additive,-for example, a brominated aromatic carbonate-oligomer, -polymer or - copolymer.

The weight ratio of constituent A to constituent B in the polymer mixture according to the invention preferably lies between 90: 10 and 10: 90, more preferably between 80: 20 and 20: 80.

In the polymer mixture according to the invention constituent A may be, for example, a polybutylene terephthalate and constituent B may be a polyethylene terephthalate or a mixture of a polyethylene terephthalate and a thermoplastic elastomer, for example, a polyether ester block copolymer.

A. The first polyalkylene phthalate

Constituent A in the polymer mixture according to the invention is a polyalkylene phthalate which comprises more than 35 mol% of units derived from 1,4-butanediol and which comprises more than 35 mol% of units derived from terephthalic acid. In addition to 1,4-butanediol the polyalkylene phthalate may comprise units derived from one or more other aliphatic, cyclic or aromatic diol compounds or polyol compounds. In addition to units derived from terephthalic acid, the polyalkylene phthalate may comprise units derived from other dicarboxylic acids or polycarboxylic acids.

A polybutylene terephthalate is preferably used as the first polyalkylene phthalate. It is also possible to use a mixture of various polyalkylene phthalates provided the content of units derived from 1,4-butanediol and from terephthalic acid in the mixture satisfies the condition mentioned hereinbefore.

B. Constituent B

The polymer mixture comprises as constituent B

B1 a second polyalkylene phthalate which comprises less than 15 mol% of units derived from 1,4-butanediol; or B2 a thermoplastic elastomer selected from a polyether ester block copolymer, a polyester ester urethane and a polyetherimide ester or a mixture thereof; or B3 a mixture of B1 and B2; and B1 is a polyalkylene phthalate which is not equal to constituent A. It comprises units derived from a diol compound and a dicarboxylic acid. In addition it may comprise units derived from polyol compounds and/or derived from polycarboxylic acids. Condition, however, is that the polyalkylene phthalate comprises less than 15 mol% (15 of the approximately 50 mol% of units derived from a diol which are usually present in a polyalkylene phthalate) of units derived from 1,4-butanediol. Suitable diol compounds are aliphatic, aromatic or cyclic diol compounds.

B2. Thermoplastic elastomer

The polymer mixture according to the invention may comprise one or more of the following thermoplastic elastomers.

Polyether ester block copolymers are generally obtained by condensation polymerisation of one or more dicarboxylic acids, one or more long-chain glycols and one or more short-chain glycols.

Examples of suitable polyether ester block copolymers are described in DE-C-2338615 and , DE-B-2460258, as well as in the literature references mentioned therein.

As a polyester ester urethane is preferably used a block copolymer which is built up from polyester ester units which are bonded by means of groups of the formula R1, [NHC(O)]p wherein R1 is a polyfunctional group having at most 30 carbon atoms and p has a value of 2 or 3. The polyester ester units are built up from blocks having a number of ester units of the formula —OGOC(O)$R_2$C(O)- and blocks having a number of ester units which are capable of forming a bifunctional polyester or polyester amide having a melting-point of less than 100° C. These blocks are bonded together by ester bonds wherein at least 80 mol% of the R2 groups are 1,4-phenylene radicals and wherein at least 80 mol% of the G-groups are a tetramethylene group.

Such polymers and their mode of preparation are described, for example, in EP-A-0102115, U.S. Pat. No. 4,186,257 and U.S. Pat. No. 4,228,249.

As a polyether imide ester is preferably used a block copolymer obtained by reaction of a diol of low molecular weight, a dicarboxylic acid, a poly(oxyalkylene)-diamine and a tricarboxylic acid or a derivative thereof. Such polymers are described, for example, in U.S. Pat. No. 4,544,734, U.S. Pat. No. 4,556,705 and U.S. Pat. No. 4,556,688, C. Transesterification inhibitor The polymer mixture according to the invention comprises a transesterification inhibitor selected from an inorganic pyrophosphate; an inorganic phosphate having at least two acid hydrogen atoms or an inorganic orthophosphate with crystal water or a mixture of one or more of these phosphates.

Many transesterification inhibitors are known. In this connection reference may be made, for example. to the patent publications already mentioned hereinbefore. However, it has been found that the synergistic effect occurs when specific transesterification inhibitors are used as stated in the appended claims.

Examples of suitable transesterification inhibitors which may be used in the polymer mixture according to the invention are inorganic pyrophosphates: for example, acid sodium pyrophosphate ($Na_2H_2P_2O_7$), inorganic phosphates having at least two acid hydrogen atoms:

mono zinc dihydrogen phosphate ( $Zn(H_2PO_4)_2$)

mono calcium dihydrogen phosphate ($Ca(H_2PO_4)_2$)

inorganic orthophosphates with crystal water:

zinc phosphate ($Zn_3(PO_4)_2.6H_2O$ trisodium phosphate ( $Na_3PO_4.6H_2O$

Examples of very closely related transesterification inhibitors which, however, are not suitable, are: diammonium phosphate, dicalcium phosphate and dried-zinc orthophosphate without crystal water.

The transesterification inhibitor is preferably used in a quantity from 0.01 to 2 parts by weight per 100 parts by weight of A +B.

D. Nucleating agent

The polymer mixture according to the invention comprises talcum or carbon black as a nucleating agent.

Experimental investigations have demonstrated that other known nucleating agents, for example, sodium stearate and barium sulphate, do not show the found synergistic effect.

The nucleating agent is preferably used in a quantity from 0.05 to 5 parts by weight per 100 parts by weight of the constituents A +B.

In addition to the constituents mentioned hereinbefore, the polymer mixture according to the invention may comprise any constituent conventionally used for such polymer mixtures. The polymers which are generally known for improving the impact strength may be mentioned in particular. Herewith are meant in the first instance copolymers and graft copolymers which comprise rubber-like constituents. Examples are the core-shell graft polymers having a rubber-like core on which one or more monomers have been grafted.

Examples of further suitable constituents for the polymer mixture according to the invention are the following: flame-retarding additives, reinforcing and non-reinforcing fillers, oxidation stabilisers, release agents, processing additives, dyes and/or pigments.

The invention will now be described in greater detail with reference to the ensuing specific examples.

The following constituents were used in the examples to be described hereinafter:

A. PBT-1: a polybutylene terephthalate having an intrinsic viscosity of approximately 0.70 ml/g measured in a phenol- (1,1,2,2-tetrachloroethane ) mixture 60:40 at 25° C.

B. PET: a polyethylene terephthalate having a weight-averaged molecular weight of approximately 90,000.

TPE: a polyether ester block copolymer having 44% by weight of polyether blocks and 56% by weight of polyester units. The polyether blocks are built-up units derived from polytetramethylene glycol and polyethylene glycol in a weight ratio of 85:15. The ester units are derived from butanediol, hexane-diol and terephthalic acid. Molar ratio butanediol to hexanediol is 70: 30.

C. ZP: Zinc phosphate with crystal water ($Zn_3(PO_4)_2.2H_2O$)

MAP: mono-ammonium dihydrogen phosphate ($NH_4H_2PO_4$)

MZP: mono-zinc dihydrogen phosphate ($Zn(H_2PO_4)_2.2H_2O$ ).

SAPP acid sodium pyrophosphate ($Na_2H_2P_2O_7$)

DAP diammonium hydrogen phosphate ($(NH_4)_2HPO_4$)

D. T: talcum having a particle size smaller than 30 micrometres.

CB: carbon black having a density of approximately 1700–1900 kg/m3

Ba $SO_4$: barium sulphate

NaSt: sodium stearate

Other:

PE: finely ground polyethene

GV: glass fibres having a length of 3.5–5.5 mm

AO: an antioxidant on the basis of a hindered phenol

UVA: a benzotriazole UV absorption agent.

In the following examples, various polymer mixtures were prepared. The constituents used were compounded in an extruder (at a temperature adjusted on an average at 280° C.) and pelletised. The glass fibres were fed laterally into the extruder.

Test rods were injection moulded from the pellets. For Differential Scanning Calorimetry analysis, samples (approximately 10 mg) were cut from the said rods and then heated to 300° C. (20° C. per minute). The samples were then cooled (20° C. per minute) and again heated.

In the first heating the melting-points of constituent A and constituent B were measured (ml); upon cooling the crystallisation temperature Tc was measured and upon heating for the second time the melting-points of constituent A and constituent B were measured (Tm2).

When the melting-points of constituents A and B after the second heating are shifted little with respect to the first heating, transesterification between the various polyesters has not occurred or has occurred hardly.

A higher Tc value means in practice that the polymer mixture upon cooling crystallises sooner. This is of importance for the injection moulding cycle time. The sooner crystallisation occurs, the shorter becomes the said cycle time.

EXAMPLES I TO V AND COMPARATIVE EXAMPLES A TO C.

The compositions as recorded in Table I hereinafter were prepared and examined by means of Differential Scanning Calorimetry. The results obtained are also recorded in Table I.

Tc of the examples according to the invention (I to V). This means that the combination of nucleating agent and transesterification inhibitor provides a Tc increase which exceeds that of the ingredients individually. Moreover, the polymers crystallise out separately when the above combination of nucleating agent and transesterification inhibitor is added.

EXAMPLE VI

The synergistic effect as established for the polymer mixtures according to the invention did not occur in a mixture of two different polybutylene terephthalates (having different values for the intrinsic viscosity). Example

EXAMPLE VII AND COMPARATIVE EXAMPLES F TO H

Various polymer mixtures were prepared. The resulting mixtures were examined by means of DSC. The composition and the results are recorded in Table II hereinafter.

TABLE II

| | Example | | | |
|---|---|---|---|---|
| | G | F | H | VII |
| Composition (parts by weight) | | | | |
| A. PBT-1 | 37.4 | 39 | 37 | 37 |
| B. PET | 38 | 38.3 | 39.2 | 39.1 |
| C. DAP | 0.2 | — | — | — |
| ZP | — | — | — | 0.2 |
| D. T | 2 | — | — | — |

TABLE I

| | Example | | | | | | | | | | |
|---|---|---|---|---|---|---|---|---|---|---|---|
| | A | 8 | C | D | E | F | I | II | III | IV | V |
| Composition (parts by weight) | | | | | | | | | | | |
| A. PBT-1 | 39 | 37 | 37 | 37 | 39 | 39 | 37 | 37 | 37 | 37 | 37 |
| B. PET | — | 38.1 | 38.1 | 38 | 38.1 | 38.3 | 38.1 | 38.1 | 38.1 | 37.7 | — |
| TPE | 38.3 | — | — | — | — | — | — | — | — | — | 38.1 |
| C. ZP | — | — | — | — | — | — | — | — | — | 0.6 | — |
| MZP | — | 0.2 | 0.2 | — | 0.2 | — | 0.2 | — | — | — | 0.2 |
| MAP | — | — | — | — | — | — | — | — | 0.2 | — | — |
| SAPP | — | — | — | — | — | — | — | 0.2 | — | — | — |
| D. T | — | — | — | 2 | — | — | 2 | 2 | 2 | 2 | 2 |
| BaSO$_4$ | — | — | 2 | — | — | — | — | — | — | — | — |
| NaSt | — | 2 | — | — | — | — | — | — | — | — | — |
| PE | 2 | 2 | 2 | 2 | 2 | 2 | 2 | 2 | 2 | 2 | 2 |
| GV | 20 | 20 | 20 | 20 | 20 | 20 | 20 | 20 | 20 | 20 | 20 |
| AO | 0.5 | 0.5 | 0.5 | 0.5 | 0.5 | 0.5 | 0.5 | 0.5 | 0.5 | 0.5 | 0.5 |
| UVA | 0.25 | 0.25 | 0.25 | 0.25 | 0.25 | 0.25 | 0.25 | 0.25 | 0.25 | 0.25 | 0.25 |
| DSC results (°C.) | | | | | | | | | | | |
| Tm1 (PBT-1) | 225 | 222 | 222 | 219 | 220 | 220 | 222 | 222 | 222 | 222 | 233 |
| Tm1 (PET) | — | 248 | 248 | 249 | 250 | 250 | 248 | 250 | 250 | 250 | — |
| Tm1 (TPE) | 225 | — | — | — | — | — | — | — | — | — | 233 |
| Tc | 184 | 174 | 188 | 179 | 181 | 164 | 194/203 | 190/198 | 190/198 | 187/193 | 200 |
| Tm2 (PBT-1) | 220 | 205 | 218 | 203 | 220 | 211 | 218 | 218 | 216 | 208 | 232 |
| Tm2 (PET) | — | 218 | 240 | 226 | 245 | 229 | 240 | 237 | 237 | 230 | — |
| Tm2 (TPE) | 220 | — | — | — | — | — | — | — | — | — | 232 |

Two different values of Tc means that constituents A and B crystallise separately. As may be seen from the results of Table I, the compositions of the comparative examples (A to F) have one value for Tc which is lower than both values of TABLE II-continued

|  | Example | | | |
|---|---|---|---|---|
|  | G | F | H | VII |
| CB | — | — | 1 | 1 |
| Other | | | | |
| PE | 2 | 2 | 2 | 2 |
| GV | 20 | 20 | 20 | 20 |
| UVA | 0.25 | 0.25 | 0.25 | 0.25 |
| AO | 0.15 | 0.5 | 0.5 | 0.5 |
| DSC results (°C.) | | | | |
| Tm1 PBT | 225 | 224 | 224 | 224 |
| Tm1 PET | 250 | 250 | 250 | 250 |
| Tc | 175 | 170 | 180 | 191/197 |
| Tm2 PBT | 203 | 202 | 208 | 220 |
| Tm2 PET | 222 | 222 | 228 | 240 |

It may be seen from the results of Table II (comparative example G) that diammonium hydrogen phosphate (DAP) provides no essential change of Tc.

Comparative examples G, F and H demonstrate that the addition of a nucleating agent (carbon black or talcum) leads to an increase of Tc. The Tc may still be further increased by the addition of zinc orthophosphate with crystal water (ZP).

This is a surprising result since phosphorus compounds, in the absence of a nucleating agent, have no or only little influence on the Tc-value. For this purpose see the results of Table I.

Moreover, nucleating agents and phosphorus compounds (added separately) never show separate crystallisation temperatures.

All the patent publications mentioned hereinbefore in this Patent Application are considered to be incorporated herein by reference.

We claim:

1. A polymer mixture comprising
   A) a first polyalkylene phthalate which comprises more than 35 mol% of units derived from 1,4-butanediol and which comprises more than 35 mol% of units derived from terephthalic acid; and
   B) a component selected from the group consisting of:
      B1 a second polyalkylene phthalate which comprises less than 15 mol% of units derived from 1,4-butanediol; or
      B2 a thermoplastic elastomer selected from a polyether ester block copolymer, a polyester ester urethane and a polyether imide ester or mixture thereof; or
      B3 a mixture of B1 and B2, and
   C) a transesterification inhibitor selected from an inorganic pyrophosphate; an inorganic phosphate having at least two acid hydrogen atoms or an inorganic orthophosphate or a mixture thereof wherein said transesterification inhibitor is present in an amount from 0.01 to 2 parts by weight per 100 parts by weight A and B, and
   D) a nucleating agent selected from the group consisting essentially of talcum; carbon black or a mixture thereof wherein said nucleating agent is present in an amount from 0.05 to 5 parts by weight per 100 parts by weight A and B.

2. A polymer mixture as claimed in claim 1, wherein the weight ratio between constituents A and B lies between 90:10 and 10:90.

3. A polymer mixture as claimed in claim 1, wherein constituent A is polybutylene terephthalate and constituent B is polyethylene terephthalate.

4. A polymer mixture comprising
   A) polybutylene terephthalate; and
   B) a polyether ester block copolymer, and
   C) a transesterification inhibitor selected from an inorganic pyrophosphate; an inorganic phosphate having at least two acid hydrogen atoms or an inorganic orthophosphate or a mixture thereof wherein said transesterification inhibitor is present in an amount from 0.01 to 2 parts by weight per 100 parts by weight A and B, and
   D) a nucleating agent selected from the group consisting essentially of talcum; carbon black or a mixture thereof wherein said nucleating agent is present in an amount from 0.05 to 5 parts by weight per 100 parts by weight A and B.

5. A polymer mixture as claimed in claim 1, wherein the polymer mixture moreover comprises a polymer to improve the impact strength.

6. A polymer mixture as claimed in claim 1, wherein the polymer mixture moreover comprises one or more of the following additives: flame-retardant additives, reinforcing and non-reinforcing fillers, oxidation stabilisers, release agents, processing additives, dyes and/or pigments.

7. Articles formed from the polymer mixture as claimed in claim 1.

* * * * *